United States Patent
Szwabowski et al.

(10) Patent No.: US 8,935,080 B2
(45) Date of Patent: Jan. 13, 2015

(54) ENGINE RESPONSE ADJUSTMENT

(75) Inventors: Steven Joseph Szwabowski, Northville, MI (US); Craig Thomas Hodorek, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 395 days.

(21) Appl. No.: 13/358,728

(22) Filed: Jan. 26, 2012

(65) Prior Publication Data
US 2013/0197775 A1    Aug. 1, 2013

(51) Int. Cl.
*F02D 41/06*    (2006.01)

(52) U.S. Cl.
USPC .................. 701/110; 701/90; 123/196 S

(58) Field of Classification Search
USPC ............... 701/80, 82, 84, 101–104, 107, 701/110–113; 123/196 S, 198 D
See application file for complete search history.

(56) References Cited

U.S. PATENT DOCUMENTS

| | | | |
|---|---|---|---|
| 6,078,859 A * | 6/2000 | Jastrzebski et al. | 701/93 |
| 6,178,371 B1 * | 1/2001 | Light et al. | 701/93 |
| RE37,434 E * | 11/2001 | Onari et al. | 701/110 |
| 6,654,677 B2 | 11/2003 | Weber et al. | |
| 6,988,028 B2 * | 1/2006 | Iriyama | 701/93 |
| 7,499,787 B2 | 3/2009 | Hrovat et al. | |
| 8,112,214 B2 * | 2/2012 | Lehner et al. | 701/93 |
| 8,195,370 B2 * | 6/2012 | Simon et al. | 701/54 |
| 8,364,368 B2 | 1/2013 | Hanzawa et al. | 701/70 |
| 8,370,042 B2 * | 2/2013 | Tokimasa et al. | 701/94 |
| 8,437,938 B2 * | 5/2013 | Whitney et al. | 701/93 |
| 8,660,767 B2 * | 2/2014 | Nakai et al. | 701/70 |
| 2001/0025218 A1 * | 9/2001 | Shimada et al. | 701/86 |
| 2004/0040765 A1 * | 3/2004 | Satou et al. | 180/170 |
| 2006/0155451 A1 * | 7/2006 | Kuwahara et al. | 701/51 |
| 2006/0293841 A1 | 12/2006 | Hrovat et al. | |
| 2008/0114521 A1 | 5/2008 | Doering | |

* cited by examiner

*Primary Examiner* — John Kwon
*Assistant Examiner* — Johnny H Hoang
(74) *Attorney, Agent, or Firm* — Julia Voutyras; Alleman Hall McCoy Russell & Tuttle LLP

(57) ABSTRACT

Methods and systems are provided for adjusting an engine output delivered in response to an operator pedal actuation based at least on a grade of vehicle travel. During uphill travel, in the presence of headwinds, and/or in the presence of a vehicle payload, the output may be increased while during downhill travel or in the presence of tailwinds, the output may be decreased. In this way, driver fatigue during travel over varying elevations, varying ambient conditions, and varying loads can be reduced.

21 Claims, 7 Drawing Sheets

ENGINE RESPONSE ADJUSTMENT

BACKGROUND AND SUMMARY

Vehicles systems receive various operator commands in order to facilitate operator control of the powertrain, including an accelerator pedal position input. Further, the relationship between the amount of pedal depression by the operator and the powertrain response can be tuned to provide different speed and torque controls.

One example approach for adjusting a pedal position map is provided by Weber at al. in U.S. Pat. No. 6,654,677. Therein, a powertrain controller varies the mapping of an accelerator pedal position to an electronic throttle angle based on the vehicle speed to improve operator control over vehicle speed, torque output, and acceleration. In particular, at lower vehicle speeds, the pedal position is mapped to the electronic throttle angle with focus on providing acceleration control, while at higher vehicle speeds, the pedal position is mapped to the electronic throttle angle with focus on controlling vehicle speeds.

However, the inventors herein have identified potential issues with such an approach. As an example, when the vehicle is travelling in regions of varying elevation, the pedal position map of Weber at al. may provide either too little torque or too much torque. For example, on an uphill grade, additional pedal movement may be required to provide the same speed, acceleration, or torque control, while ascending the grade Likewise, on a downhill grade, less pedal movement may be required to provide the same speed, acceleration, or torque control while descending the grade. As another example, even if the vehicle is not travelling on an uphill or downhill grade, the same issues may arise in the presence of headwinds or tailwinds. During all such operating conditions, the operator may need to be extra attentive and may need to frequently readjust the amount of pedal depression applied without knowing how much is necessary to maintain a desired vehicle speed (or vehicle acceleration). As such, this may degrade the drive feel and lead to operator dissatisfaction.

At least some of the above issues may be addressed by a method for controlling a vehicle engine comprising adjusting a relationship between an operator accelerator pedal depression amount and an engine output torque based on a grade of vehicle travel. In this way, by adjusting the relationship between pedal input and vehicle output using an indication of track elevation, the amount of driver effort required to maintain a level of vehicle performance may be reduced.

In one example, as the vehicle travels on an incline, the relationship between the pedal input and an engine output torque may be adapted with a higher gain based on the grade of uphill travel. This allows the vehicle to provide a higher output torque for a given pedal depression when climbing an uphill, and reduces the additional pedal movement required by the operator. As another example, when the vehicle travels on a decline, the relationship between the pedal input and an engine output torque may be adapted with a lower gain based on the grade of downhill travel. This allows the vehicle to provide a lower output torque for the given pedal depression when descending a downhill, and reduces the frequent pedal readjustment required by the operator. Similar adjustments may also be made in the presence of headwinds or tailwinds so that the driver's perception of vehicle performance is not degraded. Likewise, adjustments may be made to compensate for the effects of a load on the vehicle, such as when the vehicle is towing or carrying cargo or payloads, since a nominal relationship between the pedal input and the engine output torque may be based on an assumption of an unloaded vehicle.

Note that the relationship between driver pedal input and vehicle and/or engine output may be adjusted in a variety of ways, including gradually adjusting the relationship as environmental conditions change, as well as further adjusting the relationship based on various operating parameters such as engine speed, vehicle speed, gear ratio, etc. Further, gain adjustment may include adjusting software-based transfer functions, algorithms, analog circuitry, signal processing, and/or combinations thereof.

In this way, the amount of additional operator effort required to operate a vehicle while a road grade changes may be reduced. As such, this may improve the operator's perception of performance and the overall drive experience.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
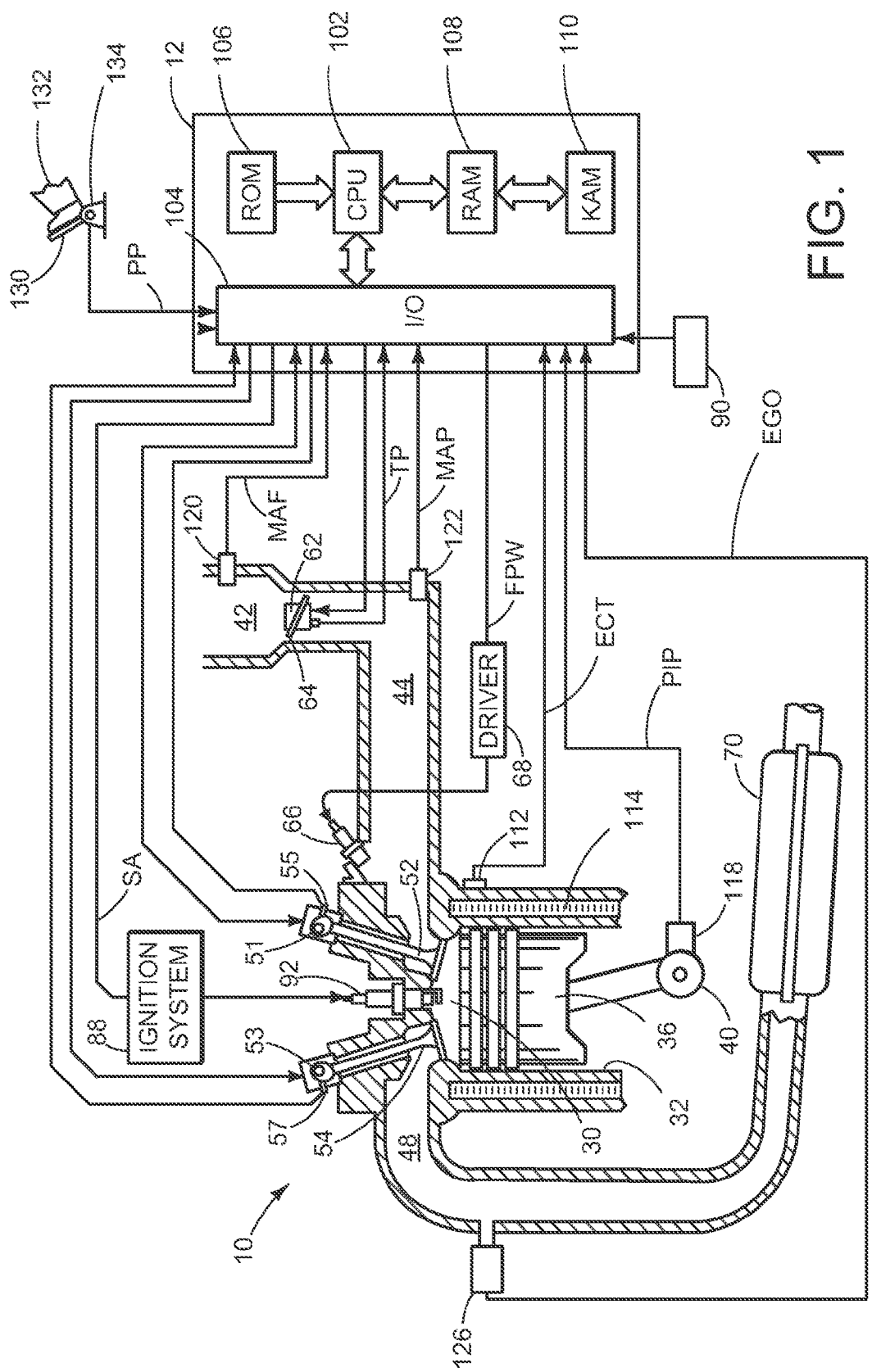
FIG. 1 is a schematic depiction of an exemplary embodiment of an engine system according to the present disclosure.
Figure 6:
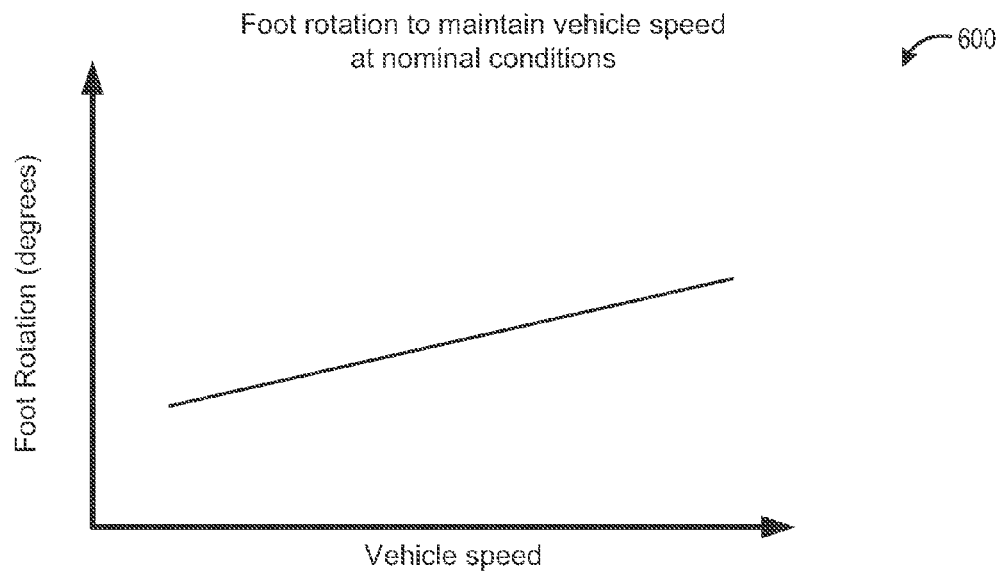
FIG. 6 shows an example map of a driver foot rotation required to maintain vehicle speed at nominal conditions of road grade.
Figure 7:
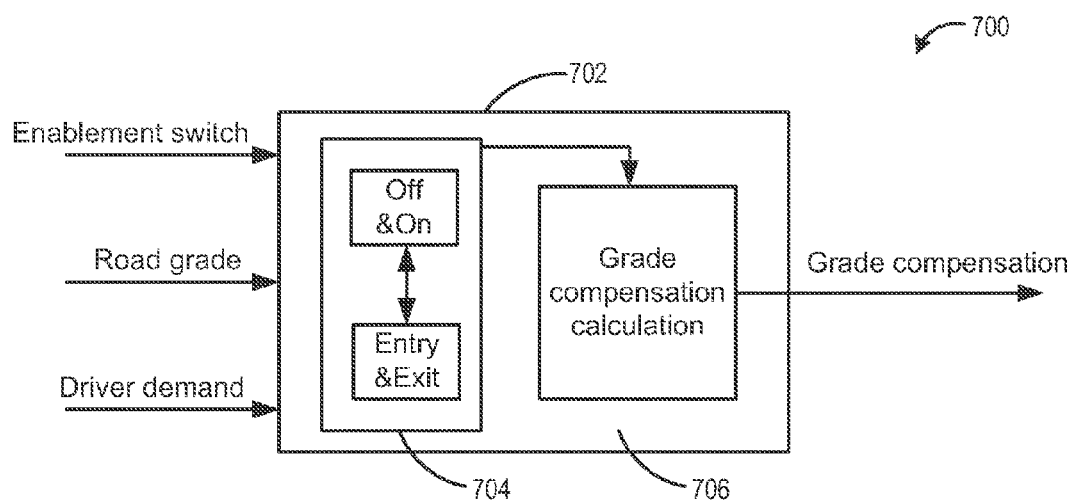
FIG. 7 shows an example block diagram depicting the grade compensation algorithm applied to adjust a pedal position map.

The present application describes methods and systems for adjusting the relationship between an accelerator pedal signal and engine output torque in the engine system of FIG. 1. An engine controller may map an accelerator pedal signal to an engine output torque and further adjust the mapping with an adaptation term that is based on selected vehicle operating conditions. The controller may be configured to perform a control routine, such as the example routines of FIGS. 2-3, to determine a gain function based on vehicle operating conditions, such as vehicle road grade, the presence of headwinds or tailwinds, as well as a load being carried or towed by the vehicle. Example gain function adjustments are described herein with reference to the graphs of FIGS. 4A-B and 5A-B. In some embodiments, the controller may apply a grade compensation algorithm (FIG. 7) so that as the road elevation varies, the pedal position of the operator may be maintained as close to a nominal pedal position (FIG. 6) as possible. An example pedal position compensation is shown in the example of FIG. 7. By varying the engine torque that is output upon a given amount of pedal depression based on the elevation of the road, the presence of headwinds or tailwinds, and the presence of a vehicle load, the amount of extra effort and attention required by a vehicle operator to maintain a given level of vehicle performance may be reduced to improve their drive experience.

FIG. 1 shows a schematic diagram of one cylinder of multi-cylinder internal combustion engine 10. Combustion chamber or cylinder 30 of engine 10 is shown including combustion chamber walls 32 and piston 36 positioned therein and connected to crankshaft 40. A starter motor (not shown) may be coupled to crankshaft 40 via a flywheel (not shown). Cylinder 30 may communicate with intake port 44 and exhaust port 48 via respective intake valve 52 and exhaust valve 54. Intake valve 52 and exhaust valve 54 may be actuated via intake camshaft 51 and exhaust camshaft 53. Further, the position of intake camshaft 51 and exhaust camshaft 53 may be monitored by intake camshaft sensor 55 and exhaust camshaft sensor 57 respectively. Intake and/or exhaust valve control may also be provided by signals supplied by controller 12 via electric valve actuation (EVA). Additionally intake and exhaust valves may be controlled by various other mechanical control systems including cam profile switching (CPS), variable cam timing (VCT), variable valve lift (VVL), and/or variable valve timing (VVT). In some embodiments, a valve control strategy may include a combination of two or more of the above mentioned control techniques. While cylinder 30 is shown having only one intake valve and one exhaust valve, it should be appreciated that in some embodiments cylinder 30 may have two or more intake and/or exhaust valves.

In some embodiments, each cylinder of engine 10 may be configured with one or more fuel injectors for providing fuel thereto. As a non-limiting example, cylinder 30 is shown including one fuel injector 66. Fuel injector 66 is shown coupled to intake port 44 for delivering injected fuel in proportion to the pulse width of signal FPW received from controller 12 via electronic driver 68. In this manner, fuel injector 66 provides what is known as port injection (hereafter also referred to as "PFI") of fuel into combustion cylinder 30. It will be appreciated that, in an alternate embodiment, injector 66 may be a direct injector injecting fuel directly into cylinder 30. It will also be appreciated that while the depicted embodiment illustrates the engine being operated by injecting fuel via a single port injector; in alternate embodiments, the engine may be operated by using two injectors (for example, a direct injector and a port injector) and varying a relative amount of injection from each injector.

Fuel may be delivered to fuel injector 66 by a fuel system (not shown) including a fuel tank, fuel pumps, and a fuel rail. Engine 10 is described herein with reference to a gasoline burning engine, however it should be appreciated that in some embodiments, engine 10 may be configured to utilize a variety of fuels including gasoline, diesel, alcohol, and combinations thereof.

Intake port 44 is shown communicating with intake manifold 42 via throttle plate 64. Further, throttle plate 64 may be coupled to electric motor 62 such that the position of throttle plate 64 may be controlled by controller 12 via electric motor (or actuator) 62. Such a configuration may be referred to as electronic throttle control (ETC), which may be utilized during idle speed control as well.

Distributorless ignition system 88 may provide ignition spark to combustion chamber 30 via spark plug 92 in response to spark advance signal SA from controller 12. Though spark ignition components are shown, engine 10 (or a portion of cylinders thereof) may not include spark ignition components in some embodiments and/or may be operated without requiring a spark.

Engine 10 may provide torque to a transmission system (not shown) via crankshaft 40. Crankshaft 40 may be coupled to a torque converter which is also coupled to a transmission via a turbine shaft. Torque converter may include a bypass, or lock-up clutch. The lock-up clutch may be actuated electrically, hydraulically, or electro-hydraulically, for example. The transmission may comprise an electronically controlled transmission with a plurality of selectable discrete gear ratios. Alternatively, in some embodiments, the transmission system may be configured as a continuously variable transmission (CVT), or a manual transmission.

Exhaust gas sensor 126 is shown coupled to exhaust port 48 upstream of catalytic converter 70. It should be noted that sensor 126 may correspond to a plurality of various different sensors and catalytic converter 70 may correspond to a plurality of various emissions devices positioned in the exhaust, depending on the exhaust configuration. Sensor 126 may be a sensor for providing an indication of exhaust gas air/fuel ratio such as an exhaust gas oxygen (EGO) sensor, linear oxygen sensor, an UEGO, a two-state oxygen sensor, a HEGO, or an HC or CO sensor. For example, a higher voltage state of signal EGO indicates that exhaust gases may be rich of stoichiometry and a lower voltage state of signal EGO indicates that exhaust gases may be lean of stoichiometry. Further, signal EGO may be used during air/fuel control in order to estimate and validate various aspects of a desired engine control mode.

As described above, FIG. 1 merely shows one exemplary cylinder of a multi-cylinder engine, and that each cylinder has its own set of intake/exhaust valves, fuel injectors, spark plugs, etc. Furthermore, although the above described engine is shown with a port injection configuration, it should be appreciated that an engine may be configured to inject fuel directly into the cylinders.

Controller 12 is schematically shown in FIG. 1 as a microcomputer, including microprocessor unit (CPU) 102, input/output ports 104, an electronic storage medium, (ROM) 106, random access memory (RAM) 108, keep alive memory (KAM) 110, and a data bus. Storage medium read-only memory 106 can be programmed with computer readable data representing instructions executable by processor 102 for performing the methods described below as well as other variants that are anticipated but not specifically listed.

Controller 12 is shown receiving various signals from sensors coupled to engine 10, in addition to those signals previously discussed, including measurement of inducted mass air flow (MAF) from mass air flow sensor 120 coupled to intake manifold 42; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor in electronic motor 64; and absolute Manifold Pressure Signal MAP from sensor 122. A pedal position indication (PP) may be determined by a pedal position sensor 134 that senses the angle of pedal 130 according to driver input 132. In one example, pedal 130 may be an accelerator pedal. In another example, pedal 130 may be a brake pedal. Engine speed signal RPM may be generated by controller 12 from signal PIP and manifold pressure signal MAP from a manifold pressure sensor provides an indication of vacuum, or pressure, in the intake manifold. A road grade may be determined by sensor 90, for example. As another example, the road grade may be determined analytically through the use of other information available to (or in) the controller. Alternatively, road grade and other road conditions may be received from a global positioning system (GPS) coupled to the vehicle controller. For example, road grade may be read from a map database based on the position determination read from an internet server or GPS. Further still, road grade may be inferred based on actual engine or powertrain load/torque relative to a nominal road load torque at the given operating conditions.

Controller 12 may control the amount of fuel delivered by fuel injector 66 so that the air/fuel mixture in cylinder 30 may be selected to be at stoichiometry, a value rich of stoichiometry or a value lean of stoichiometry. In some embodiments, controller 12 may control the amount of fuel vapors purged into the intake port via a fuel vapor purge valve (not shown) communicatively coupled thereto. Further, in some embodiments, engine 10 may include an exhaust gas recirculation (EGR) system that routes a desired portion of exhaust gas from exhaust port 48 to intake port 44 via an EGR valve (not shown). Alternatively, a portion of combustion gases may be retained in the combustion chambers by controlling exhaust valve timing.

Based on the various inputs received, controller 12 may adjust various engine operating parameters. For example, controller 12 may adjust a spark timing of the spark plugs, a pulse width of the fuel injector, and the position of the throttle by way of the throttle actuator. Likewise, the controller may adjust an engine output torque based on the indication of driver demand and further based on other engine operating conditions. As one example, the controller 12 may map a pedal position of the accelerator pedal to a specific throttle position (or angle) to thereby provide a predetermined relationship between engine output torque and operator pedal depression amount. The map may be stored in the controller's memory and may be accessed during vehicle operation in response to pedal actuation.

The relationship between the pedal position and the engine output torque may vary based on a mode on vehicle operation. For example, during traction-control conditions, the relationship between the operator's pedal depression amount and the engine output torque may be adjusted to reduce wheel slip, for example, as based on track elevation, track coefficient of friction, vehicle tire conditions, etc. As another example, during cruise-control conditions, the relationship may be adjusted to enable speed and/or acceleration control.

As elaborated herein, during non-cruise and non-slip conditions, the controller may adjust the relationship based on the grade or elevation of the road on which the vehicle is travelling. For example, the controller may adapt the map between operator pedal depression amount and engine output torque using a gain term that is based on the road grade, or elevation. In a further embodiment, the relationship may be adjusted with a gain term that is based on the presence of headwinds or tailwinds, the speed of the winds, the direction of the winds relative to the vehicle direction of travel, etc. Still other conditions external to the vehicle that may affect the vehicle's engine torque output during vehicle operation (e.g., engine speed, ambient conditions of temperature, pressure, humidity, etc.) may be factored in when computing a gain factor. The pedal actuation to engine output map may then be adjusted with the gain to improve the vehicle's performance as the vehicle operating conditions change. In a still further embodiment, the relationship may be further adjusted based on the presence of a vehicle load being carried by and/or towed by the vehicle, such as a cargo or a payload. For example, the relationship may be adjusted with a gain term that is based on the vehicle load relative to a nominal vehicle load. The nominal vehicle load may include, for example, an unloaded vehicle without a trailer. Herein, the adjustment may include, for example, as the vehicle load exceeds the nominal vehicle load, increasing the engine output for a given pedal depression amount.

As an example, a controller may map an amount of operator foot rotation required to maintain a vehicle speed under nominal conditions (that is, at 0% road grade, in the absence of headwinds or tailwinds, and with no trailer or vehicle load being carried or towed). One such example map 600 is shown at FIG. 6. As depicted therein, under nominal conditions, as the desired vehicle speed increases, the amount of operator foot rotation (or pedal depression) required increases proportionately. During conditions of varying road grade, varying headwinds/tailwinds, or varying load being towed/carried by the vehicle, the controller may apply an appropriate gain function that compensates for the varying parameter and allows the vehicle speed to be maintained by the vehicle operator by maintaining the same (or similar) pedal position as the parameter varies. An example adjustment is elaborated herein at FIG. 8.

In this way, the system and components of FIG. 1 enable a method of controlling a vehicle engine wherein a relationship between an operator pedal depression amount and an engine torque output is adjusted based on a grade of vehicle travel. The relationship may be further adjusted based on the presence of headwinds and tailwinds, and/or the presence of a vehicle load being carried or towed by the vehicle. In this way, an accelerator pedal may be maintained as near a nominal pedal position as possible. However, in some embodiments, the grade, load, or winds may not be totally compensated for since the vehicle driver may have expectations that they should need to increase or decrease the accelerator pedal to an extent to achieve their driving objectives, such as on larger grades which are more visually obvious. This reduces the driver feeling or perception that the vehicle is driving itself. Further still, various other examples of system operation are described herein. In particular, additional details of control routines are included below which may be used with various engine configurations, such as those described in FIG. 1. As will be appreciated by one of ordinary skill in the art, the specific routines described below in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in controller 12.

Figure 2:
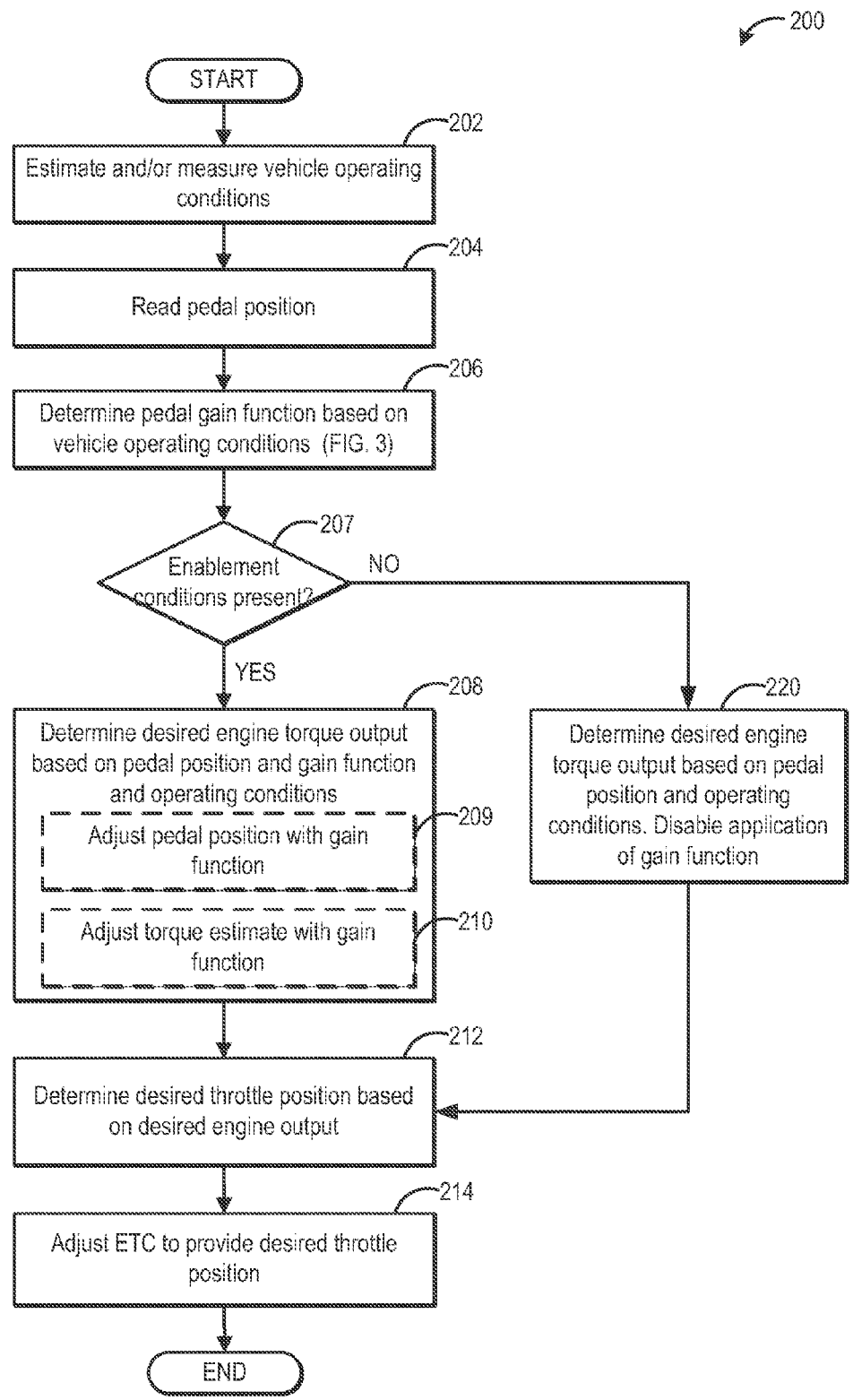
FIGS. 2-3 are example routines that may be implemented to adjust a pedal position map for the engine system of FIG. 1.
Figure 3:
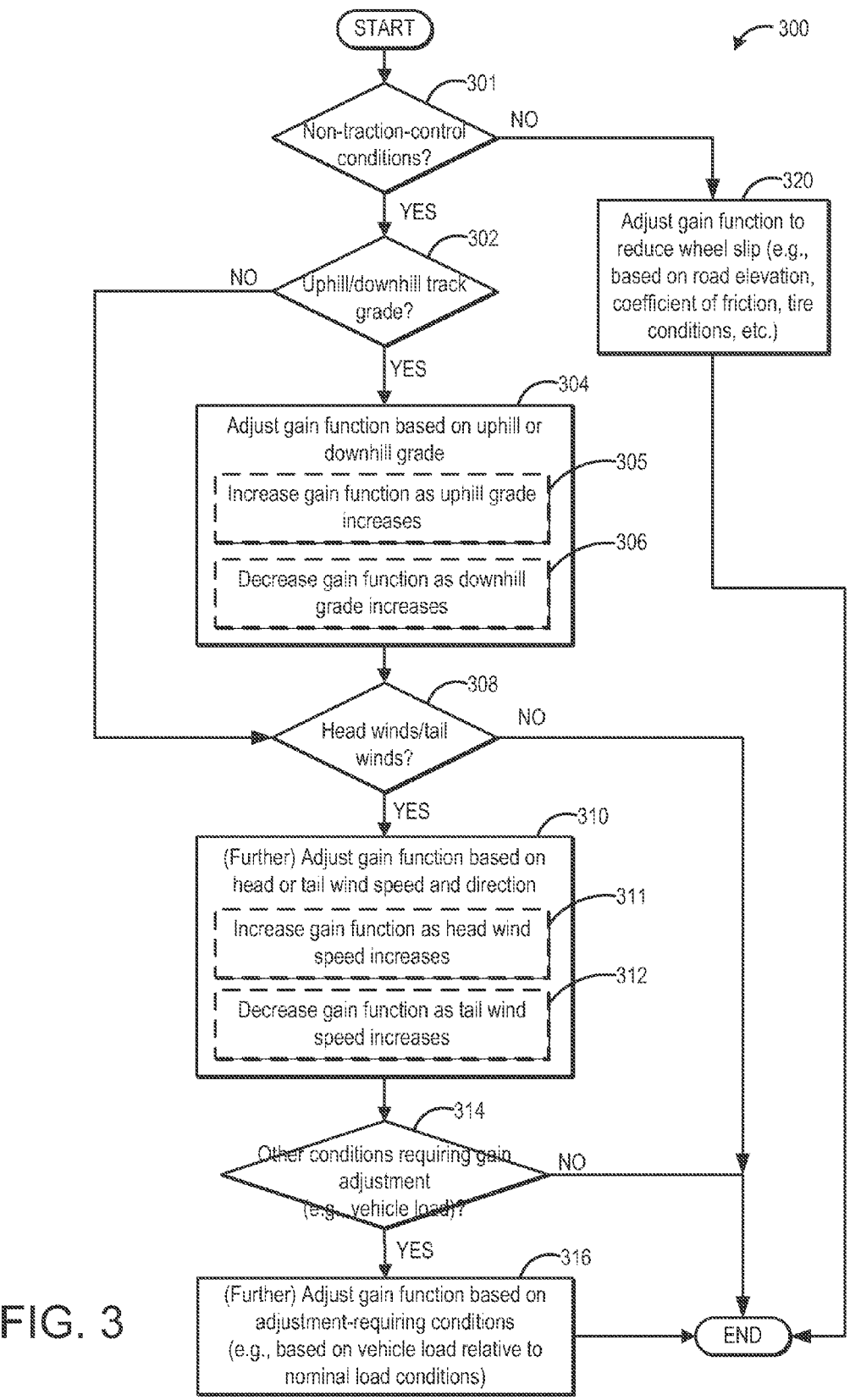

FIGS. 2-3 depict example methods for controlling engine operation in response to driver pedal actuation during changing vehicle track conditions. These may include, for example, changing track grade and/or changing track headwinds/tailwinds.

Referring now to FIG. 2, a routine is described for adjusting engine/vehicle output via an adjustable relationship with pedal actuation. At 202, vehicle operating conditions may be estimated and/or measured. These may include, for example, ambient conditions (temperature, pressure, humidity, etc.), road grade or elevation, other track conditions (e.g., track friction coefficient), the presence of headwinds or tailwinds and their details (e.g., speed, heading or direction), etc. These may also include various engine operating conditions such as for example, pedal position, engine speed, vehicle speed, engine temperature, catalyst temperature, boost level, etc.

At 204, a current pedal position as actuated by the vehicle operator may be read. For example, the routine may read the current pedal position depression (PP) from sensor 134 of FIG. 1. Input filtering, noise filtering, and/or other signal processing may also be used to process the pedal depression reading. In one example, the pedal position may be determined relative to closed pedal and wide open pedal positions as reference.

At 206, a pedal gain function may be determined based on the estimated vehicle operating conditions. The determined gain function may reflect the determined relationship between pedal depression and a desired engine and/or vehicle output, which may include a desired torque, acceleration, vehicle speed, engine speed, or combinations thereof. Further details of the determination, selection of, and/or adjustment of the relationship, based on a vehicle grade and the presence of headwinds or tailwinds are described with regard to FIG. 3. Example adjustments are elaborated with regard to FIGS. 4A-B and 5A-B.

At 207, it may be determined if gain enablement conditions are present. As such, these may be conditions which are used to determine whether or not the gain function determined at 206 is to be applied or not, and further if the gain function is to be applied at a particular time. The enablement conditions may be based on existing vehicle operating conditions such as the current vehicle speed, a driver operated performance mode configuration switch setting, or a vehicle operating state, such as traction control. If the gain function enablement conditions are not present, that is, if application of the gain function is disabled, then at 220, the driver's pedal input may be passed directly through, unmodified, to the controller, and the desired engine output may be determined based on the pedal position of 204 and not based on the determined gain function. Thereafter, the routine continues to 212 to adjust a throttle position in accordance.

In comparison, if enablement conditions are present, application of the gain function is enabled. Specifically, at 208, the routine determines the desired engine output torque based on the pedal position of 204 and the determined gain function of 206. Further, various other operating parameters may be used to determine the desired engine torque such as, for example, engine speed, vehicle speed, vehicle mode of operation, barometric pressure, ambient temperature, gear ratio, and/or other parameters. In one example, determining the desired engine output based on the pedal position and the determined gain function may include, at 209, adjusting the pedal position with the gain function and then using the adjusted pedal position to determine the desired torque output. For example, a pedal position adjustment term may be applied. In another example, determining the desired engine output based on the pedal position and the determined gain function may include, at 210, adjusting an initial torque estimate with the gain function and using the adjusted torque estimate to determine the desired torque output. For example, a torque compensation term may be applied.

In some embodiments, the controller may determine a base driver demanded engine torque output and a vehicle performance level based primarily on the accelerator pedal signal and the engine speed (e.g., the map of FIG. 6 that is based on nominal road grade and load conditions). Then, the base torque demand may be adapted using the gain function that is based on vehicle operating conditions (e.g., road elevation, track grade, etc.) to supplement the base driver demanded torque so as to maintain the determined level of vehicle performance as the road grade changes. For example, the base torque demand may be supplemented to compensate for the existing road grade, wind load, or other vehicle loading conditions (e.g., trailer towing or pick-up bed cargo). An example compensation is elaborated herein with reference to the maps of FIGS. 6 and 8.

Next, at 212, the routine determines the desired throttle position based on the desired engine output torque. For example, the routine may reference a map stored in the controller that maps the desired torque to the required throttle position. In some embodiments, the desired throttle position may be further based on engine operating conditions such as engine speed, and engine coolant temperature. At 218, the routine adjusts the electronic throttle to arrive at the desired throttle position. That is, the controller adjusts the engine output torque by adjusting a throttle position of the electronically controlled throttle plate. In an alternate embodiment, the routine may identify a desired throttle position directly in response to the pedal position of 204 and the gain function of 206 (if the gain function is enabled). In either case, the routine electronically controls the throttle position in response to the operator pedal actuation to provide a desired response characteristic via the gain/transfer function determined at 206 when the gain function is enabled.

While the throttle is used in this example to adjust engine output torque, it will be appreciated that various other engine actuators may be used. For example, alternative or additional actuation may be used to adjust engine torque. These may include, for example, valve events, valve lift, boosting, valve timing, cam timing, fuel mass and air-fuel ratio, spark timing, injection timing, or combinations thereof.

In this way, the engine throttle may be adjusted in response to the operator command taking into account current and various other operating conditions using the selected mapping of 206. As elaborated with reference to FIG. 3, during selected conditions and/or vehicle operating modes, the sensitivity of engine torque response to pedal depression may be adjusted to enable an operator to control engine or vehicle output torque during travel on a road of varying elevation with substantially the same amount of foot rotation as compared with vehicle operation on a flat road. Various other approaches may also be used to adjust engine output and/or engine throttle angle.

Now turning to FIG. 3, a routine 300 is described for adjusting a gain between an operator pedal depression amount and an engine output torque based on a grade of vehicle travel, as well as the presence of headwinds or tailwinds. Such operation may be used to enable higher gain when driving a vehicle on an uphill segment and/or in the presence of headwinds, while enabling a lower gain when driving on a downhill segment and/or in the presence of tailwinds so as to provide improved driver perception of engine performance.

At 301, the routine includes confirming that non-traction-control conditions are present. For example, it may be confirmed that the vehicle is not in a traction-control mode of vehicle operation. As such, non-traction-control conditions may include one or more of not during vehicle slip control, not during vehicle speed control, and not during vehicle traction control. If traction-control conditions are present, then at 320, the routine includes adjusting a gain function between operator pedal depression amount and engine output torque to reduce vehicle slip. For example, the gain function may be adjusted based on road elevation, track coefficient of friction, vehicle tire conditions, etc. As such, this results in a torque reduction action as appropriate to achieve adequate control of the vehicle. In some embodiments, the compensation or adaptation term required to achieve vehicle slip control (or traction control) may be calculated in advance and stored in the controller's memory for rapid access. This allows the traction control adaptation term or gain function to be available to be applied as appropriate whenever the driver applies the accelerator pedal. Additionally, if cruise control conditions are present, the gain function may be adjusted to provide vehicle speed and/or acceleration control. For example, the cruise control based gain function may be calculated in advance and stored in the controller's memory for rapid access so that the cruise control gain function is available to be applied as appropriate whenever the driver applies the accelerator pedal.

Returning to 301, if non-traction-control conditions are confirmed, then at 302, the routine includes determining a grade of vehicle travel and confirming that there is an uphill or downhill track grade. For example, it may be confirmed that the uphill or downhill track grade is higher than a threshold. Upon confirmation of an uphill or downhill track grade, at 304, the routine includes adjusting a relationship (e.g., a gain function) between an operator accelerator pedal depression amount and an engine torque output based on the determined grade of vehicle travel. That is, the relationship between operator pedal position and engine output torque may be adjusted based on vehicle grade only during non-slipping and non-cruise vehicle conditions. The adjusting may include, for example as shown at 305, varying the relationship to have a larger gain between operator pedal depression amount and engine torque output during an uphill travel. Herein, the gain may be increased as the uphill grade increases so that the torque delivered is proportional to the uphill grade. As another example, the adjusting may include, as shown at 306, varying the relationship to have a smaller gain between operator pedal depression amount and engine torque output during a downhill travel. Herein, the gain may be decreased as the downhill grade increases so that the torque delivered is proportional to the downhill grade.

Thus, the engine output torque may be increased at a first, lower rate when an operator pedal is depressed at a lower elevation, such as at sea level or on level ground. In comparison, the engine output torque may be increased at a second, higher rate when the operator pedal is depressed at a higher elevation, such as on a mountain. As such, this allows a vehicle operator to maintain a substantially similar foot rotation to achieve a desired level of vehicle performance when operating a vehicle on a level ground as well as when travelling on an incline or a decline. Example gain adjustments performed in response to the presence of uphill or downhill grades are described herein with reference to FIGS. 4A-B. As elaborated therein, the gain function may be adjusted such that the relationship between operator pedal depression amount and engine output is linear, or is adjusted differently in selected regions. As an example, the relationship may be adjusted to a greater extent at lower pedal positions (e.g., closer to a closed pedal position) than at higher pedal positions (e.g., closer to a wide open pedal position). As another example, the relationship may be adjusted to a greater extent at higher pedal positions than at lower pedal positions. Further still, the relationship may be adjusted to a greater extent at mid-pedal positions that at either higher pedal or lower pedal positions. One example of a grade compensation algorithm that may be used in the routine of FIG. 3 is illustrated in the block diagram of FIG. 7 and described herein below.

If no uphill or downhill track is confirmed at 302, or after adjusting the gain based on track grade at 306, the routine proceeds to 308 where it is determined if headwinds or tailwinds are present. As used herein, headwinds refer to the component of the wind that opposes the direction of travel of the vehicle, consequently requiring an increased load on the vehicle propulsion system to maintain a constant vehicle speed Likewise, as used herein, tailwinds refer to the component of the wind that coincides with the direction of travel of the vehicle, consequently requiring a decreased load on the vehicle propulsion system to maintain a constant vehicle speed. If present, the routine may also determine the speed, direction (or heading), and other characteristics of the headwinds/tailwinds that may affect the vehicle's trajectory. Upon confirmation, at 310, the routine includes further adjusting the relationship between operator pedal depression and engine output torque based on the presence of headwinds or tailwinds. For example, as shown at 311, the adjusting may include increasing the engine output torque produced when an operator pedal is depressed if headwinds are present. As another example, as shown at 312, the adjusting may include decreasing the engine output torque produced when an operator pedal is depressed if tailwinds are present. Herein, a rate of the increasing may be based on a speed and direction of the headwinds while a rate of the decreasing may be based on a speed and direction of the tailwinds. For example, the gain function may be increased proportionately to headwinds to maintain a vehicle speed with relatively less movement in the accelerator pedal. Likewise, the gain function may be decreased proportionately to tailwinds to maintain the vehicle speed with relatively less movement in the accelerator pedal. The amount of increase or decrease in the gain (that is, the amount by which the adjustment needs to be increased or decreased) for the wind-based load may depend on the aerodynamic loading on the vehicle created by the wind. As such, this may depend on characteristics such as the vehicle speed relative to the wind, vehicle aerodynamic drag coefficient, the frontal area of the vehicle and the air density. In some embodiments, at least some of these terms may be vehicle dependent and may need to be calibrated in a vehicle-dependent manner (e.g., based on the make and model of the vehicle). As such, by adjusting the gain function based on the wind load, a vehicle operator may maintain a substantially similar foot rotation to achieve a desired level of vehicle performance when operating a vehicle when no winds are present (that is, during nominal wind load conditions), as well as when headwinds or tailwinds are present. Example gain adjustments performed in response to the presence of headwinds or tailwinds are described herein with reference to FIGS. 5A-B.

Figure 5A:
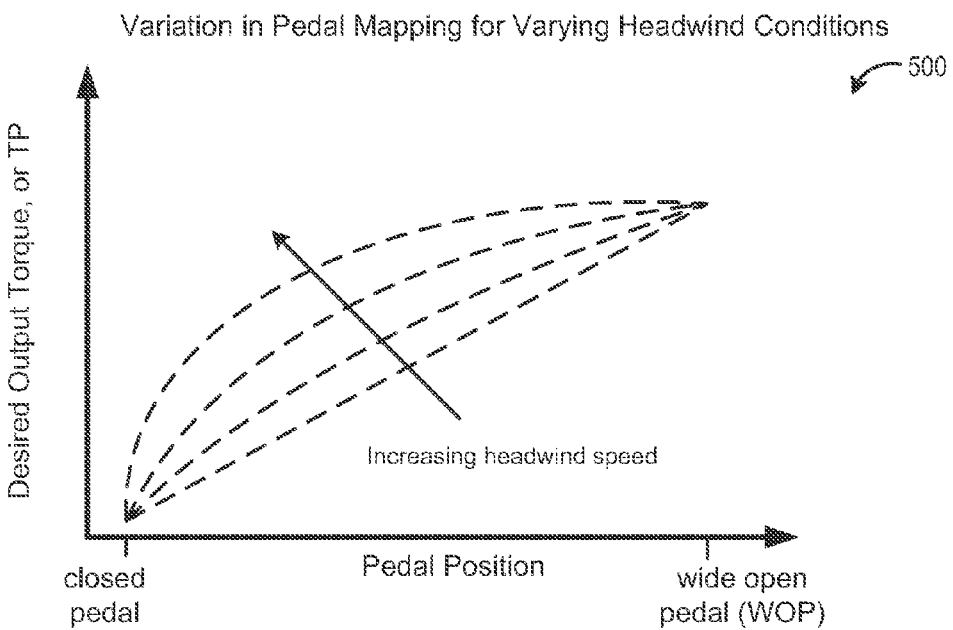
FIGS. 5A-B are graphs illustrating example pedal gain adjustments that may be performed in response to the presence of headwinds, tailwinds, or a vehicle load.
Figure 5B:
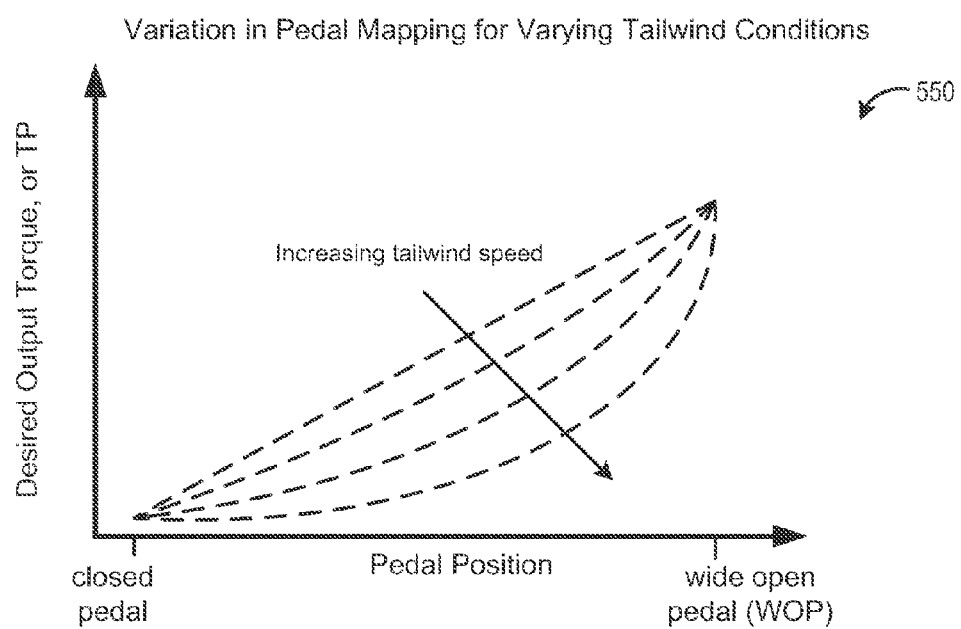

As elaborated at FIGS. 5A-B, the gain function may be adjusted such that the relationship between operator pedal depression amount and engine output is linear, or is adjusted differently in selected regions. As an example, the relationship may be adjusted to a greater extent at lower pedal positions (e.g., closer to a closed pedal position) than at higher pedal positions (e.g., closer to a wide open pedal position). As another example, the relationship may be adjusted to a greater extent at higher pedal positions than at lower pedal positions. Further still, the relationship may be adjusted to a greater extent at mid-pedal positions that at either higher pedal or lower pedal positions.

Next, at 314, the routine determines if other conditions are present requiring further gain adjustments. If yes, then at 316, the routine further adjusts the gain based on the additional adjustment-requiring conditions in a similar way as described relative to the road grade and wind load. These conditions may include other conditions that affect the load applied on the vehicle propulsion system to maintain a constant speed. As an example, this may include a vehicle load carried by or towed by the vehicle relative to a nominal load. For example, the vehicle load may include a number of passengers in the vehicle, the amount of cargo or payload loaded in and carried by the vehicle, the weight of a trailer being towed by the vehicle, etc. while the nominal load may include no cargo or payload, no trailer being towed, and no passengers. The adjustment may include increasing the engine output for a given pedal depression amount as the vehicle load exceeds the nominal vehicle load. That is, the gain function may be increased as the vehicle load exceeds the nominal vehicle load.

As previously elaborated in FIG. 2, the gain adjustment may be applied by either adjusting a pedal position with the gain factor to provide an adjusted pedal position that is then mapped to an engine output torque, or by using the pedal position to map an engine output torque and then applying the gain adjustment to the engine output torque. In addition, the adjusting of the engine torque output may be achieved by adjusting one or more engine torque actuators, for example, by adjusting a throttle position of an electronically controlled throttle plate.

In some embodiments, in addition to adjusting the gain function, the routines of FIGS. 2-3 may also transition the gain/transfer function at an appropriate timing and in an appropriate manner, based on the vehicle operating conditions. For example, based on the monitored vehicle operating conditions, it may be determined whether the conditions are within a selected window to vary the gain/transfer function. As an example, the timing of the transitioning may be varied based on whether the pedal position is at or closer to a closed pedal (released) position or whether the pedal position is at or closer to a wide open (applied/depressed) position. Herein, by varying the timing of the transitioning, smooth transitions from one gain function to another (e.g., from off to on, or on to off) may be enabled. In another example, it may be determined whether sufficient modulation of the pedal by the operator is being performed. In still another example, the timing may be based on the grade of the track, or change in grade over time. For example, the timing may be expedited as a rate of climbing an incline increases. As yet another example, the timing may be varied based on vehicle speed or acceleration. Further still, various other selected windows may be used to vary the gain/transfer function. Adjusting the timing of the gain function may include adjusting the determined gain function over a predetermined duration or number of engine operating cycles. For example, a filtering may be used to provide slower variation in adjustment of the throttle response in response to the gain function adjustment. In this way, the pedal gain can be adjusted in a selected way during selected conditions to enable improved driver performance.

FIG. 7 illustrates an example block diagram 700 depicting a grade compensation algorithm that may be applied in the routine of FIG. 3 to adjust a pedal position map. It will be appreciated that while the block diagram of FIG. 7 illustrates a grade compensation based on road grade, this is not meant to be limiting, and similar compensations may be made for a wind load and a vehicle load experienced by a vehicle system.

Grade compensation algorithm 702 receives inputs from a vehicle including a road grade (as estimated or inferred), a driver demand (e.g., based on estimated driver operating conditions), as well as input from an enablement switch. In one example, the enablement switch may be turned on if gain function enablement conditions are present. Based on the received inputs, transition logic 704 may determine whether entry or exit conditions for transitioning in to or out of application of the grade compensation calculation have been met, and accordingly whether to turn the gain compensation adjustment on or off. That is, it is determined whether or not to enable calculation and application of the gain function, and how to transition between those states. The output of transition logic 704 is relayed to grade compensation calculation 706 which accordingly computes a grade compensation or adjustment term (herein also referred to as a grade based gain function) using which the engine output torque is adjusted. As one example, based on the received inputs, if it is determined that "entry" conditions are met and the gain function is to be enabled ("On"), the grade compensation gain function may be determined and applied, and the engine torque output adjustment may be transitioned in with the grade compensation term. As another example, based on the received inputs, if it is determined that "exit" conditions are met and the gain function is to be disabled ("Off"), the grade compensation gain function may stop being applied and the engine torque output adjustment may be transitioned out of the grade compensation term. As elaborated above, similar algorithms and transitions may be computed and applied for wind loads and other vehicle loads.

In this way, gain adjustments may be made between an operator pedal depression and an engine output torque based on vehicle operating conditions. In one example, during a first non-traction-control condition, a controller may adjust an engine output torque in response to an operator pedal depression amount based on road elevation. Herein, when the vehicle is travelling at a first, lower elevation, the controller may provide a first, smaller engine output torque in response to the operator pedal depression amount. However, when the vehicle is travelling at a second, higher elevation, the controller may provide a second, larger engine output torque in response to the same operator pedal depression amount. The controller may further adjust the engine torque output based on headwinds or tailwinds and the corresponding wind load such that when the vehicle is travelling in the presence of headwinds, the engine output torque in response to the operator pedal depression amount is increased but when the vehicle is travelling in the presence of tailwinds, engine output torque in response to the same operator pedal depression amount is decreased. Likewise, the controller may further adjust the engine torque output to compensate for other vehicle loads, such as cargo, payload, trailer load, etc.

In comparison, during a second traction-control condition, the controller may adjust the engine output torque is response to the (same) operator pedal depression amount based on wheel slip. Herein, the controller may adjust the engine output torque based on track elevation, track coefficient of friction, vehicle conditions, etc.

Figure 4A:
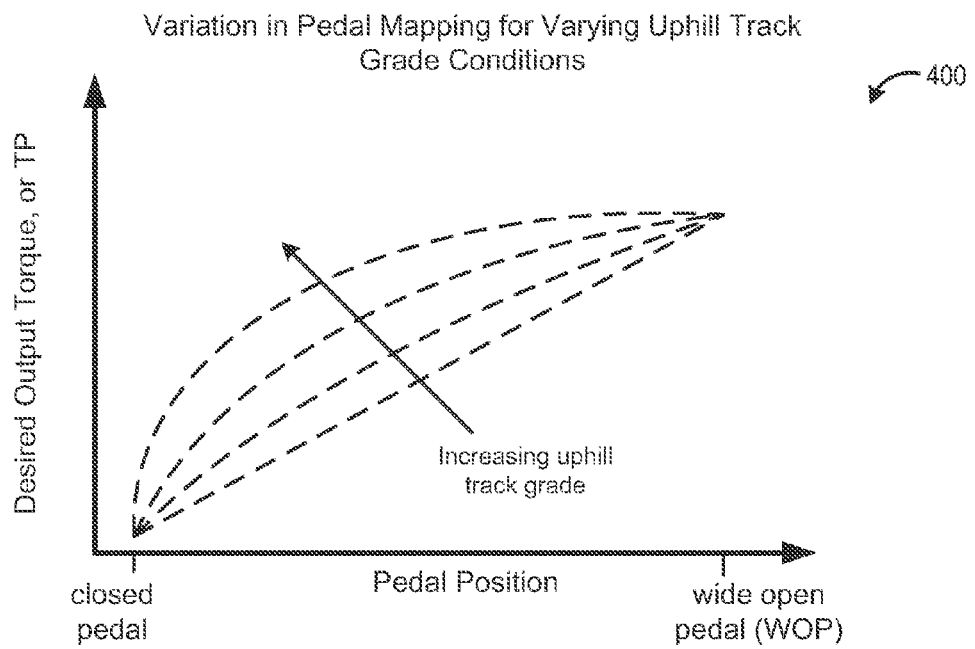
FIGS. 4A-B are graphs illustrating example pedal gain adjustments that may be performed in response to varying road elevation.

Example adjustments are now described with reference to the maps of FIGS. 4A-B and FIGS. 5A-B. In particular, referring now to FIG. 4A, graph 400 illustrates variation in the pedal mapping for varying uphill track grade condition. Specifically, FIG. 4A shows an example gain function between pedal position (as a pedal position changes from closed pedal to wide-open pedal, along the x-axis) and a desired engine output torque or throttle position (or compensated accelerator pedal position) (along the y-axis). In the depicted example, as an uphill track grade increases (that is, a road elevation increases) a higher gain is provided with the relationship adjusted to a greater extent at lower pedal positions (that is, closer to the closed pedal position) than at higher pedal positions (that is, closer to the wide open pedal position). That is, in the depicted example, a relatively higher gain or a relatively greater slope is provided at lower pedal positions than at higher pedal positions. Herein, by varying the gain in a specified region, greater adjustment (e.g., de-tuning) may be provided at lower pedal positions while providing a more consistent response at higher pedal positions. However, in alternate embodiments, the relationship may be adjusted differently. For example, during selected conditions, the relationship may be linear to pedal position, or the relationship may be adjusted to a greater extent at higher pedal positions. In still another example, the relationship may be adjusted to a greater extent at mid-pedal positions (that is, in between the closed pedal and the wide open pedal positions) than at either lower pedal or higher pedal positions. In this way, a substantially continuous relationship between closed pedal and wide-open pedal can be maintained while still providing variable gain.

Figure 4B:
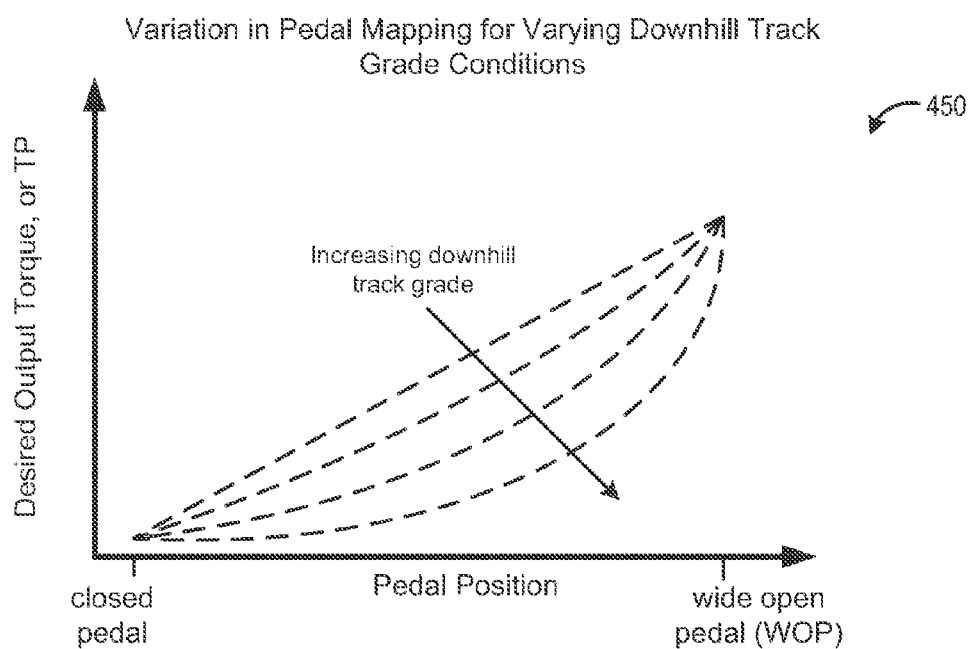

Now referring now to FIG. 4B, graph 450 illustrates variation in the pedal mapping for varying downhill track grade condition. In the depicted example, as downhill track grade increases, a lower gain is provided with the relationship adjusted to a greater extent at higher pedal positions (that is, closer to the wide open pedal position) than at lower pedal positions (that is, closer to the closed pedal position). That is, in the depicted example, a relatively lower gain is provided at higher pedal positions than at lower pedal positions. Herein, by varying the gain in a specified region, greater adjustment (e.g., de-tuning) may be provided at higher pedal positions while providing a more consistent response at lower pedal positions. However, in alternate embodiments, the relationship may be adjusted differently. For example, during selected conditions, the relationship may be linear to pedal position, or the relationship may be adjusted to a greater extent at lower pedal positions. In still another example, the relationship may be adjusted to a greater extent at mid-pedal positions (that is, in between the closed pedal and the wide open pedal positions) than at either lower pedal or higher pedal positions. Referring now to FIGS. 5A-B, graphs 500 and 550 illustrate variations in the pedal mapping for varying headwind conditions (FIG. 5A) and varying tailwind conditions (FIG. 5B). Specifically, FIG. 5A shows an example gain function between pedal position (as a pedal position changes from closed pedal to wide-open pedal, along the x-axis) and a desired engine output torque or throttle position (or compensated accelerator pedal position) (along the y-axis). Therein, as a headwind speed increases, a higher gain is provided with the relationship adjusted to a greater extent at lower pedal positions than at higher pedal positions. In comparison, FIG. 5B shows an example gain function wherein, as a tailwind speed increases, a lower gain is provided with the relationship adjusted to a greater extent at lower pedal positions than at higher pedal positions. As with FIGS. 4A-B, other relationships may be possible including, but not limited to linear relationships, as well as relationships that are adjusted to a greater extent at mid-pedal positions (that is, in between the closed pedal and the wide open pedal positions) than at either lower pedal or higher pedal positions.

In one example, the determined gain functions may be applied to a nominal pedal position map to generate a compensated pedal position map. One example of a nominal pedal position map is shown in FIG. 6. Therein map 600 depicts a nominal accelerator pedal map that is established for nominal vehicle conditions including the vehicle travelling on a smooth flat road (that is, 0% road grade) on a windless day (that is, 0% wind load), with nominal vehicle load. The nominal vehicle load may exclude conditions of trailer towing, or the vehicle being heavily laden with cargo. Additionally, the nominal conditions may include nominal ambient or environmental conditions of temperature, humidity, and barometric pressure. As shown in map 600, during such nominal conditions, the amount of operator foot rotation or pedal depression required to maintain a desired vehicle speed may be represented by a linear relationship. That is, to maintain a given vehicle speed, a nominal pedal position (or pedal angle or pedal depression) may be determined. In the absence of a compensation term, to maintain the same vehicle speed in the presence of varying road grade, wind load, or vehicle load, the operator may need to readjust their foot rotation. Specifically, in the presence of an uphill road, a headwind load, or a towing/cargo load, the amount of foot rotation may need to be increased. As such, this may lead to driver fatigue. Thus, to enable the driver to maintain the vehicle over the varying road grade, wind load, or vehicle load, while also maintaining the same or similar amount of foot rotation, an appropriate compensation term or gain function may be applied.

Figure 8:
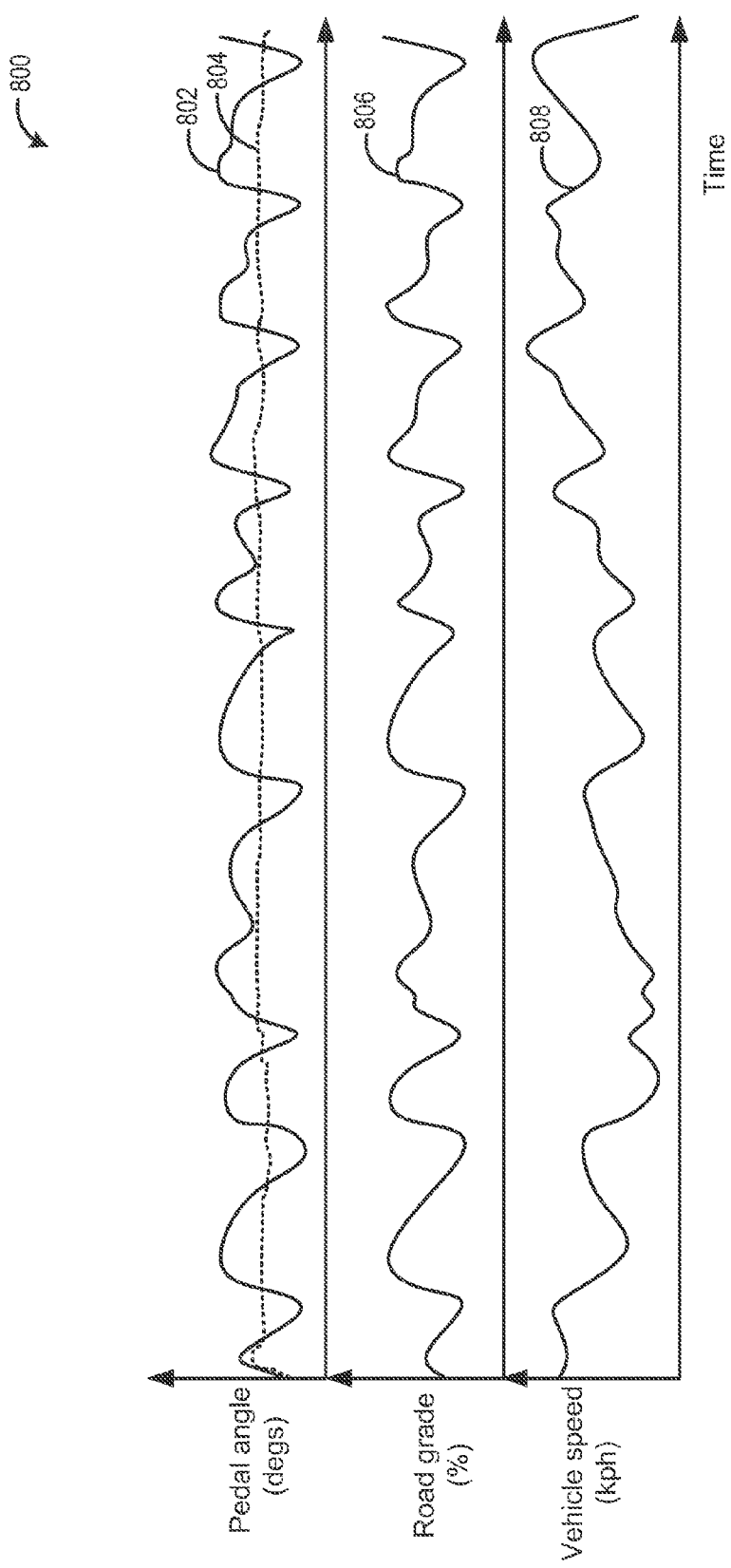
FIG. 8 shows an example map of a grade compensated pedal adjustment using the grade compensation algorithm of FIG. 7.

An example grade based compensation is depicted in the map of FIG. 8. Specifically, map 800 depicts changes in a vehicle speed at 808, changes in a road grade at 806, and corresponding changes in a grade compensated pedal position input at 802. By adjusting the grade-based compensation term or gain function applied to achieve a grade compensated pedal position input 802, a driver may be able to maintain a driver accelerator pedal angle 804 (dotted graph) even as road grade changes to attain the desired vehicle speed. As such, this reduces the driver effort required to maintain the vehicle speed by reducing the need for frequent repositioning of the driver foot, thereby reducing driver fatigue.

In this way, a pedal to vehicle response gain may be varied during travel on roads of varying elevation and in the presence of varying wind loads and vehicle loads to reduce the amount of additional effort required by a driver to maintain a level of vehicle performance. By reducing the amount of foot rotation and pedal readjustment required by a vehicle operator to ascend or descend a grade, in the presence of winds or while towing cargo, driver fatigue may be reduced while improving the driver's perception of vehicle performance. Overall, an operator's drive experience can be enhanced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a vehicle engine, comprising determining a grade of vehicle travel; and
during non-slipping and non-cruise vehicle conditions, adjusting a relationship between an operator accelerator pedal depression amount and an engine output torque based on the determined grade of vehicle travel.

2. The method of claim 1, further comprising adjusting engine output torque based on the adjusted relationship, wherein the adjusting includes varying the relationship to have a larger gain between operator accelerator pedal depression amount and engine output torque during an uphill travel, and a smaller gain between operator pedal depression amount and engine output torque during a downhill travel.

3. The method of claim 2, wherein the gain is increased as an uphill grade increases, and wherein the gain is decreased as a downhill grade of travel increases.

4. The method of claim 1, wherein the adjusting includes, increasing the engine output torque at a lower rate when an operator pedal is depressed at a lower elevation; and
increasing the engine output torque at a higher rate when the operator pedal is depressed at a higher elevation.

5. The method of claim 4, wherein the relationship is further adjusted based on a presence of headwinds or tailwinds.

6. The method of claim 5, wherein the further adjusting includes,
increasing the engine output torque when the operator pedal is depressed if headwinds are present; and
decreasing the engine output torque when the operator pedal is depressed if tailwinds are present.

7. The method of claim 6, wherein a rate of the increasing is based on a speed and direction of the headwinds, and wherein a rate of the decreasing is based on a speed and direction of the tailwinds.

8. The method of claim 1, wherein the relationship is adjusted with a higher gain at lower pedal positions than at higher pedal positions.

9. The method of claim 1, wherein the relationship is adjusted to a greater extent at mid-pedal positions than at either lower pedal positions or higher pedal positions.

10. The method of claim 1, wherein the engine output torque is adjusted by adjusting a throttle position of an electronically controlled throttle plate.

11. The method of claim 1, wherein the relationship is further adjusted based on a vehicle load relative to a nominal vehicle load, the vehicle load including a load carried by and/or towed by the vehicle, wherein the adjustment includes, as the vehicle load exceeds the nominal vehicle load, increasing the engine output for a given pedal depression amount.

12. A method for a vehicle engine, comprising:
determining a road elevation and/or wheel slip;
during a first non-traction-control condition, adjusting an engine output torque in response to an operator pedal depression amount based on the determined road elevation; and
during a second traction-control condition, adjusting an engine output torque in response to the operator pedal depression amount based on the determined wheel slip.

13. The method of claim 12, wherein the first non-traction-control condition includes one or more of not during vehicle speed control, not during vehicle slip control, and not during vehicle traction control.

14. The method of claim 12, wherein the adjusting during the first non-traction-control condition includes,
when the vehicle is travelling at a first, lower elevation, providing a first, smaller engine output torque in response to the operator pedal depression amount; and
when the vehicle is travelling at a second, higher elevation, providing a second, larger engine output torque in response to the operator pedal depression amount.

15. The method of claim 14, further comprising, during the first non-traction-control condition, further adjusting the engine output torque in response to the operator pedal depression amount based on headwinds or tailwinds, the adjustment including, when the vehicle is travelling in a presence of headwinds, increasing the engine output torque in response to the operator pedal depression amount, and when the vehicle is travelling in a presence of tailwinds, decreasing the engine output torque in response to the operator pedal depression amount.

16. The method of claim 12, wherein during the second traction-control condition, the adjusting based on wheel slip includes adjusting based on road elevation, track coefficient of friction, and vehicle tire conditions, to reduce wheel slip.

17. A vehicle system, comprising:
a pedal adapted to receive a command from a vehicle operator;
a sensor configured to provide an output based on an operator pedal depression;
a sensor configured to provide an indication of a grade of travel; and
a control system with computer readable instructions for:
during non-slipping conditions, adjusting an engine output torque in response to the operator pedal depression based on the grade of travel.

18. The system of claim 17, wherein the adjusting includes, during an uphill travel, increasing a gain between an operator pedal depression amount and an engine output torque, the gain increased as a grade of uphill travel increases; and
during a downhill travel, decreasing the gain between the operator pedal depression amount and the engine output torque, the gain decreased as a grade of downhill travel increases.

19. The system of claim 18, wherein the control system is configured to further adjust the engine output torque in response to headwinds or tailwinds present during vehicle travel, the gain further increased if headwinds are present, the gain further decreased if tailwinds are present.

20. The system of claim 19, wherein the control system is configured to further adjust the engine output torque in response to a vehicle load being carried or towed by the vehicle, the gain further increased as the vehicle load exceeds a nominal vehicle load.

21. The system of claim 20, further comprising an electronically controlled throttle plate, wherein the control system includes instructions for adjusting the engine output torque by adjusting a throttle position of the electronically controlled throttle plate.

* * * * *